UNITED STATES PATENT OFFICE.

ZENO OSTENBERG, OF SAN JOSE, CALIFORNIA.

PROCESS OF PREPARING SOLUTIONS OF CELLULOSE.

1,355,415.  Specification of Letters Patent.  Patented Oct. 12, 1920.

No Drawing.  Application filed November 1, 1916. Serial No. 128,961.

*To all whom it may concern:*

Be it known that I, ZENO OSTENBERG, a citizen of the United States, and resident of San Jose, in the county of Santa Clara and State of California, have invented a certain new and useful Improvement in Processes of Preparing Solutions of Cellulose, of which the following is a specification.

My invention relates to the preparation of solutions of cellulose and consists in dissolving cellulose in a specially prepared mixture of calcium chlorid with sulfuric acid, the action of which is such as to dissolve substantially the whole of the cellulose.

While it has long been known that strong sulfuric acid will dissolve cellulose it has not been used to any extent commercially on account of the high viscosity of the solutions of even low concentrations. It has also been known for some time that hydrochloric acid of more than 39% concentration will dissolve cellulose, but acids of this or greater concentration are difficult to prepare and store in large quantities. I have shown in a previous application that mixtures of hydrochloric acid and sulfuric acid, or hydrochloric acid and phosphoric acid, or hydrochloric acid, sulfuric acid and phosphoric acid, will readily dissolve cellulose.

I have found that it is not necessary to prepare the hydrochloric acid separately and then mix it with the other acid or acids. If a solid chlorid such as calcium chlorid is mixed with sulfuric acid of various concentrations, a mixture of the various acids and salts results, which when kneaded with cellulose readily dissolves it. It also readily dissolves hydro-, hydrate- and oxycellulose as well as cellulose in the combined form. It is thus capable of dissolving cellulose out of wood and other cellulose containing substances with substantial readiness and completeness.

At low and ordinary temperatures the solvent has only a rather slow hydrolytic breaking down action on cellulose. For this reason the polyose, through removal of the hydrochloric acid by suction with or without dilution of the solution, or directly through dilution with, for example, alcohol, water, salt solution, dilute acids or alkalis, is precipitated as an elastic or gelatinous mass, or it may be brought into filament form by squirting under pressure through nozzles. The solutions are suitable for obtaining cellulose, for preparing cellulose esters, and for producing elastic masses for use in making films, artificial silk, etc.

In order to illustrate more clearly in what manner my invention may be carried out the following examples are given, it being understood, of course, that they are for illustrative purposes merely and are in no sense to be regarded as limiting my invention. The parts mentioned in the examples are by weight.

Example 1: 150 parts of a cold 66⅔% sulfuric acid solution is weighed out. This is thoroughly mixed with 60 parts of anhydrous calcium chlorid and the insoluble salts are removed by suitable means. To about 12 parts of this mixture are added 1 to 1½ parts of cotton and the whole mass kneaded until it becomes a viscous fluid. From this fluid a large quantity of hydrochloric acid and air may be removed by suction and the hydrochloric acid gas recovered, after which the remaining solution may be pressed through a nozzle into water, which acts as a coagulating fluid.

Example 2: 1 part cellulose material is treated in a kneading apparatus with 6 to 8 parts of a sulfuric acid-calcium chlorid mixture until it becomes a viscous, practically clear mass; it is then allowed to stand for a short time to diminish its viscosity, after which coagulation in colloids may be accomplished according to known processes.

Example 3: 1 part of ground wood or other cellulose containing material is thoroughly mixed at ordinary temperature with 7 or 8 parts of a sulfuric acid-calcium chlorid mixture for about half an hour and then allowed to stand for ten to fifteen minutes. It is then separated free from the insoluble lignin and precipitated.

Example 4: Comminuted wood or other cellulose containing material is thoroughly mixed with a solvent prepared by mixing calcium chlorid in concentrated sulfuric acid in such proportions that the total amount of water present is less than one-fifth part by weight of the cellulose and the mass kept at a temperature below 80° C. Surface solution of the particles of material occurs and the subsequent hydrolysis converts the cellulose into dextrose. The whole of the cellulose passes into solution with the subsequent formation of dextrose in a very short time. Thus if 100 parts of finely comminuted wood be used, the maximum quantity of water present at the beginning of the operation must not be more than 20 parts. 20 parts of water will require 40 parts of sulfuric acid (as in example 1) and this will require 24 parts of calcium chlorid. When the materials are thoroughly mixed, five parts of cellulose go into solution within about ten seconds and the whole mass becomes cemented together. 100 parts of wood contain 50–60 parts of cellulose so that only 10% of the cellulose is dissolved at once. But the cellulose in solution slowly changes to dextrose even at room temperature and this allows more cellulose to be dissolved, which in turn is changed to dextrose, until finally all of the cellulose has passed into solution. In this manner only a small amount of the acid-chlorid mixture need be used in order to fractionally or continuously dissolve a large quantity of cellulose in order that it may be transformed into dextrose.

The concentrated calcium chlorid solutions produced as a by-product in the ammonia-soda process are very suitable for this process. Obviously, if the chlorid is in solution a more concentrated sulfuric acid must be used.

I claim:—

1. The process of preparing solutions of cellulose which comprises mixing the cellulose with a solvent prepared by mixing calcium chlorid and sulfuric acid of more than 60% concentration.

2. The process of preparing solutions of cellulose by dissolving the cellulose in a mixture of the reaction products of calcium chlorid and sulfuric acid, in such proportions that the ratio of acid to water present is greater than one part acid to two parts water.

3. The process of preparing solutions of cellulose which comprises treating the cellulose with a solvent prepared by mixing calcium chlorid and sulfuric acid containing such an amount of water that the total amount of water present is equal to less than one-fifth of the weight of the cellulose.

Signed at San Jose, in the county of Santa Clara and State of California, this 26th day of October, 1916.

ZENO OSTENBERG.